United States Patent Office 3,077,484
Patented Feb. 12, 1963

3,077,484
2-FORMYL ANDROSTANES AND PROCESS THEREFOR
Albert Bowers, John Edwards, and James C. Orr, all of Mexico City, Mexico, assignors, by mesne assignments, to Syntex Corporation, a corporation of Panama
No Drawing. Filed Aug. 3, 1961, Ser. No. 128,971
Claims priority, application Mexico Apr. 12, 1961
23 Claims. (Cl. 260—397.4)

The present invention relates to certain new cyclopentanophenanthrene derivatives and to a method for the preparation thereof.

More particularly, our invention relates to the novel 2-formyl derivatives of androstan-17β-ol, which may further possess a lower 17α-alkyl, alkenyl or alkynyl group; it also comprises the preparation of the esters of such compounds and of the corresponding 19-nor derivatives.

These novel compounds are powerful anabolic agents having a favorable anabolic-androgenic ratio; they help to increase the protein metabolism and the deposition of calcium on the bone tissue; they further exhibit anti-estrogenic activity, lower the cholesterol level in the blood and inhibit the secretion of gonadotrophins by the pituitary gland.

The 17α-alkenyl and 17α-alkynyl compounds further posses progestational activity.

The novel compounds of the present invention are represented by the following formula:

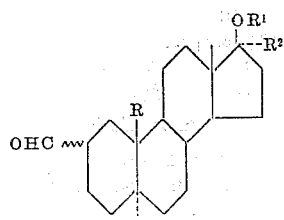

In the above formula R represents hydrogen or methyl, $R^1$ represents hydrogen or an acyl group derived from a carboxylic acid of 1 to 12 carbon atoms; $R^2$ represents hydrogen or a lower alkyl, alkenyl or alkynyl group such as methyl, ethyl, propyl, vinyl, ethynyl or propynyl. The wavy line at C–2 indicates the α or β configuration for the substituent at such position.

The acyl groups referred to above derive from carboxylic acids of less than 12 carbon atoms, saturated or unsaturated, of straight, branched, cyclic or mixed aliphatic-cyclic chain, substituted or not with hydroxyl, methoxy, amino, halogen or other groups; typical such esters are the acetate, propionate, butyrate, valerate, hemisuccinate, enanthate, caproate, benzoate, undecenoate, trimethylacetate, phenoxyacetate, cyclopentylpropionate and β-chloropropionate.

The novel compounds object of our invention are obtained by oxidation of the 2α and 2β-hydroxymethyl-androstanes and 19-nor-androstanes, or by hydrogenation of the 2-formyl-Δ²-androstenes and 19-nor-androstenes.

In our copending patent application Serial No. 128,972, filed on August 3, 1961, there is described the preparation of 2α and 2β-hydroxymethyl-androstanes and their 17α-alkyl, alkenyl and alkynyl substituted derivatives, as well as the corresponding 19-nor derivatives.

In our copending patent application Serial No. 128,974, filed on August 3, 1961, there is described the preparation of 2-formyl-Δ²-androstenes starting from 2-alkoxymethylene derivatives of dihydroallotestosterone and 19-nor-dihydroallotestosterone, as well as from their 17α-alkyl, alkenyl and alkynyl substituted derivatives, which upon reduction with a double metal hydride produce the corresponding 3-hydroxy compounds; the latter, upon acid treatment give rise to the formation of the 2-formyl-Δ²-androstenes and 19-nor-androstenes.

The 2α and 2β-formyl derivatives of androstan-17β-ol and 19-nor-androstan-17β-ol, as well as of their 17α-alkyl, alkenyl and alkynyl substituted derivatives, are obtained by oxidation of an ester of 2α or 2β-hydroxymethyl-androstan-17β-ol or of their 19-nor derivatives, with chromic acid in pyridine, at low temperature, preferably between 0° and 5° C., and for a period of time between 6 and 10 hours. By oxidation of 2α and 2β-hydroxymethyl-17α-alkyl, alkenyl or alkynl androstan-17β-ol, of the corresponding 19-nor compounds, or of an ester of the same, there are obtained the 2α and 2β-formyl derivatives of 17α-alkyl, 17α-alkenyl and 17α-alkynyl androstan-17β-ol, the corresponding 19-nor derivatives and the esters of the same.

Where the starting compound contains an ester group, this could be saponified by well known methods. The 17β-hydroxy-2α and 2β-formyl-androstanes may be esterified with anhydrides or chlorides of acids of 1 to 12 carbon atoms, in pyridine solution for the C-17α unsubstituted compounds, or in benzene solution and in the presence of p-toluenesulfonic acid for the 17α-alkyl, alkenyl and alkynyl substituted derivatives.

The 2α and 2β-formyl derivatives of androstan-17β-ol and of 17α-alkyl-androstan-17β-ol, as well as of the corresponding 19-nor compounds may also be obtained through the method illustrated by the following series of reactions:

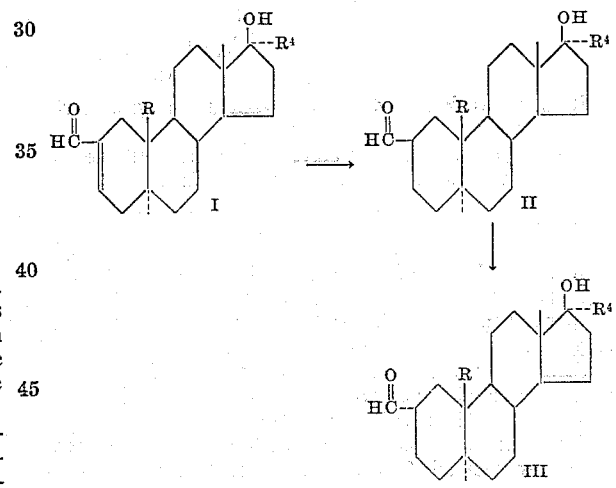

In the above formulas R represents hydrogen or methyl and $R^4$ represents hydrogen or a lower alkyl group.

By catalytic hydrogenation of 2-formyl-Δ²-androsten-17β-ol, 2-formyl-19-nor-Δ²-androsten-17β-ol or one of their 17α-alkyl substituted derivatives (I), until the absorption of 1 molar equivalent of hydrogen, there are obtained the 2β-formyl-androstanes as well as the corresponding 19-nor compounds (II). This hydrogenation is carried out in the presence of a palladium catalyst, such as 5% palladium on charcoal, 10% palladium on barium sulfate, 10% palladium on calcium carbonate, etc. Suitable solvents for this reaction are ethyl acetate, ethanol, methanol, tetrahydrofuran and dioxane.

By alkaline treatment of the above compounds, using for example a dilute solution of sodium methoxide in methanol, 0.5% ethanolic potassium hydroxide, potassium t-butoxide in t-butanol, etc., there are obtained the 2α-formyl compounds (III). Thus, for example, by hydrogenation of 2-formyl-Δ²-androsten-17β-ol in ethyl acetate solution and in the presence of 5% palladium on charcoal, there is obtained 2β-formyl-androstan-17β-ol, which is converted into the 2α-isomer by treatment with sodium methoxide.

2α - formyl - androstan - 17β - ol and 2α - formyl-19-nor-androstan-17β-ol may also be obtained by reducing a 2-lower alkoxymethylene-dihydroallotestosterone, preferably 2-methoxymethylene-dihydroallotestosterone, (IV) and its 19-nor derivative with lithium aluminum hydride, thus giving 2-methoxymethylene-androstan-17β-ol and 2 - methoxymethylene - 19 - nor - androstan - 17β - ol (V). By hydrolysis of these compounds with perchloric acid in ether for a prolonged period of time, preferably for 16 to 24 hours, there are obtained 2α-formyl-androstan - 17β - ol and 2α - formyl - 19 - nor - androstan-17β-ol (VI). The method described above is represented by the following series of reactions:

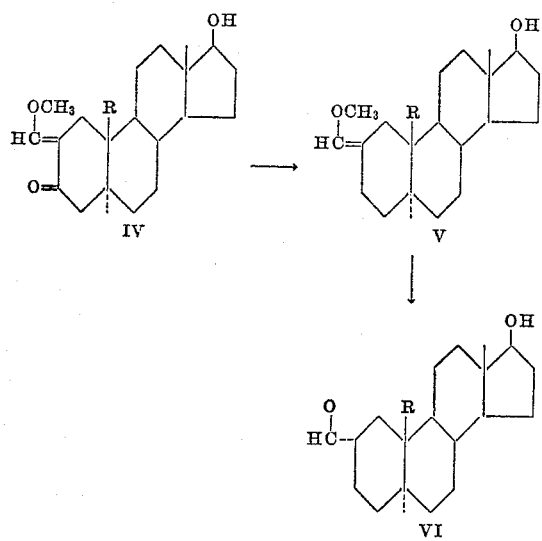

In the above formulas R has the same meaning set forth previously.

The following examples serve to illustrate but are not intended to limit the scope of the invention:

Example I

A solution of 2 g. of 2α-hydroxymethyl-17α-methyl-androstan -17β-ol in 20 cc. of pyridine was treated with 1 g. of chromic acid in 10 cc. of pyridine and the mixture was kept at 0° C. for 10 hours, then diluted with ethyl acetate and filtered through celite; the filtrate was washed with hydrochloric acid solution, with 5% sodium carbonate solution and with water to neutral, dried over anhydrous sodium sulfate and evaporated to dryness under vacuum. Crystallization of the residue from acetone-ether yielded 2α-formyl-17α-methyl-androstan-17β-ol.

A mixture of 1 g. of 2α-formyl-17α-methyl-androstan-17β-ol, 25 cc. of benzene, 2 cc. of acetic anhydride and 500 mg. of p-toluenesulfonic acid was kept at room temperature for 48 hours and then diluted with water; the benzene layer was separated, successively washed with 5% sodium carbonate solution and water, dried over anhydrous sodium sulfate and evaporated to dryness under reduced pressure. The residue was dissolved in 50 cc. of 0.5% methanolic potassium hydroxide solution, kept for 1 hour at room temperature, treated with water and extracted with ethyl acetate; the extract was washed to neutral, dried and evaporated to dryness under vacuum. By chromatography of the residue followed by crystallization of the solid fractions from acetone-ether there was obtained the acetate of 2α-formyl-17α-methyl-androstan-17β-ol.

Example II

By following the method of oxidation described in the preceding example, 2α and 2β-hydroxymethyl-17α-ethynyl-19-nor-androstan-17β-ol were respectively converted into 2α-formyl-17α-ethynyl-19-nor-androstan-17β-ol and 2β-formyl-17α-ethynyl-19-nor-androstan-17β-ol.

By esterification of 2α - formyl - 17α - ethynyl-19-nor-androstan,17β-ol with propionic anhydride in benzene solution and in the presence of p-toluenesulfonic acid, followed by alkaline treatment, there was obtained the corresponding propionate.

Example III

By following the method of oxidation described in Example I, the hydroxymethyl compounds mentioned below in column I were converted into the corresponding 2-formyl derivatives (column II).

| I | II |
|---|---|
| 2α-hydroxymethyl-17α-ethynyl-androstan-17β-ol. | 2α-formyl-17α-ethynyl-androstan-17β-ol. |
| 2α-hydroxymethyl-17α-vinyl-androstan-17β-ol. | 2α-formyl - 17α - vinyl-androstan-17β-ol. |
| 2β-hydroxymethyl-17α-vinyl-androstan-17β-ol. | 2β-formyl - 17α - vinyl-androstan-17β-ol. |
| 2β-hydroxymethyl-17α-methyl-19-nor-androstan-17β-ol. | 2β-formyl-17α-methyl-19-nor-androstan-17β-ol. |
| 17-acetate of 2β-hydroxymethyl-17α-methyl-androstan-17β-ol. | acetate of 2β - formyl - 17α-methyl-androstan-17β-ol. |
| 2β-hydroxymethyl-17α-propargyl-androstan-17β-ol. | 2β-formyl - 17α - propargyl-androstan-17β-ol. |

Example IV

A solution of 2.5 g. of 2-formyl-Δ²-androsten-17β-ol in 50 cc. of ethyl acetate was hydrogenated at room temperature and atmospheric pressure in the presence of 500 mg. of 5% palladium on charcoal catalyst which had been previously reduced. After the uptake of 1 molar equivalent of hydrogen the catalyst was removed by filtration through celite and the filtrate was evaporated to dryness. Crystallization of the residue from methylene chloride-hexane afforded 2β-formyl-androstan-17β-ol.

A mixture of 1 g. of the above compound, 5 cc. of pyridine and 2 cc. of benzoyl chloride was allowed to react overnight at room temperature, poured into water and the precipitate formed was collected, thus giving the benzoate of 2β-formyl-androstan-17β-ol.

Example V

A mixture of 1 g. of 2β-formyl-androstan-17β-ol and 25 cc. of a 0.5% solution of sodium methoxide was kept for 5 hours at room temperature and then poured into water. The precipitate formed was collected by filtration and crystallized from methylene chloride-hexane, thus furnishing 2α-formyl-androstan-17β-ol.

A mixture of 500 mg. of the above compound, 2 cc. of pyridine and 1 cc. of acetic anhydride was heated on the steam bath for 1 hour and poured into water; the precipitate formed was collected, thus giving the acetate of 2α-formyl-androstan-17β-ol.

By the same method, but using caproic anhydride and undecenoic anhydride as esterifying agents there were obtained the caproate and the undecenoate of 2α-formyl-androstan-17β-ol.

Example VI

By following the method of hydrogenation described in Example IV, 2 g. of 2-formyl-17α-methyl-19-nor-Δ²-androsten-17β-ol was converted into 2β-formyl-17α-methyl-19-nor-androstan-17β-ol, identical with the one obtained in Example III.

Example VII

A solution of 1 g. of 2-formyl-17α-ethyl-Δ²-androsten-17β-ol in 25 cc. of tetrahydrofuran was hydrogenated in the presence of 150 mg. of 10% palladium on barium sulfate, until the uptake of one molar equivalent of hydrogen. The catalyst was removed by filtration through celite and the filtrate was evaporated to dryness. By crystallization from acetone-hexane there was obtained 2β-formyl-17α-ethyl-androstan-17β-ol.

300 mg. of the above compound was treated with sodium methoxide in methanol, in accordance with the method described in Example V, thus giving 2α-formyl-17α-ethyl-androstan-17β-ol.

Example VIII

There was repeated the preceding Example, but using as starting compound 2-formyl-19-nor-Δ²-androsten-17β-ol, thus obtaining 2β-formyl-19-nor-androstan-17β-ol and 2α-formyl-19-nor-androstan-17β-ol. Esterification of the latter compound with propionic anhydride in pyridine produced the propionate of 2α-formyl-19-nor-androstan-17β-ol.

Example IX

A solution of 2 g. of 2-methoxymethylene-androstan-17β-ol-3-one (obtained by esterification of 2-hydroxymethylene-dihydroallotestosterone with diazomethane) in 50 cc. of tetrahydrofuran was cautiously added to 1 g. of lithium aluminum hydride in 100 cc. of anhydrous ether and the resulting mixture was refluxed for 16 hours. The mixture was cooled, the excess of anhydride was destroyed by the addition of methanol and after acidifying with dilute hydrochloric acid the organic layer was separated, washed to neutral, dried over anhydrous sodium sulfate and evaporated to dryness. By crystallization of the residue from acetone-hexane there was obtained 2-methoxymethylene-androstan-17β-ol.

To a solution of 500 mg. of the above compound in 50 cc. of ether was added 5 drops of 70% perchloric acid and the mixture was kept overnight at room temperature, then washed with water to neutral, dried over anhydrous sodium sulfate and evaporated until the product crystallized. There was thus obtained 2α-formyl-androstan-17β-ol, identical with the compound obtained in Example V.

In the same manner 2-methoxymethylene-19-nor-dihydroallotestosterone was converted into 2α-formyl-19-nor-androstan-17β-ol, identical with that obtained in Example VIII. Esterification with undecenoic anhydride in pyridine afforded the undecenoate of 2α-formyl-19-nor-androstan-17β-ol.

Example X

A solution of 2 g. of the propionate of 2β-propionoxymethyl-17α-propargyl-androstan-17β-ol, obtained as described in our patent application Serial No. 128,972, filed on August 3, 1961, in 100 cc. of methanol was treated with 10 cc. of a 2% solution of potassium hydroxide in methanol and the mixture was kept at 0° C. for 2 hours, then neutralized with acetic acid and concentrated to a small volume under vacuum. Water was added until complete precipitation of the product which was collected and crystallized from acetone-ether, thus giving the 17-propionate of 2β-hydroxymethyl-17α-propargyl-androstan-17β-ol.

The above compound was oxidized with chromic acid in pyridine, in accordance with the method described in Example I, to produce the propionate of 2β-formyl-17α-propargyl-androstan-17β-ol.

We claim:
1. A compound of the following formula:

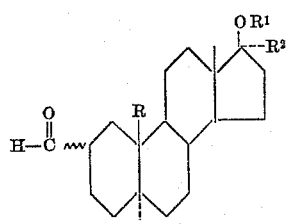

wherein R is selected from the group consisting of hydrogen and methyl; R¹ is selected from the group consisting of hydrogen and a hydrocarbon carboxylic acyl group of less than 12 carbon atoms; and R² is selected from the group consisting of hydrogen, lower alkyl, lower alkenyl and lower alkynyl.

2. 2α-formyl-androstan-17β-ol.
3. The acetate of 2α-formyl-androstan-17β-ol.
4. 2β-formyl-androstan-17β-ol.
5. 2α-formyl-17α-methyl-androstan-17β-ol.
6. 2β-formyl-17α-methyl-androstan-17β-ol.
7. The acetate of 2α-formyl-17α-methyl-androstan-17β-ol.
8. The acetate of 2β-formyl-17α-methyl-androstan-17β-ol.
9. 2-formyl-17α-ethyl-androstan-17β-ol.
10. 2-formyl-17α-vinyl-androstan-17β-ol.
11. 2-formyl-17α-ethynyl-androstan-17β-ol.
12. 2α-formyl-17α-ethynyl-androstan-17β-ol.
13. 2-formyl-17α-propargyl-androstan-17β-ol.
14. 2α-formyl-19-nor-androstan-17β-ol.
15. 2β-formyl-19-nor-androstan-17β-ol.
16. The propionate of 2α-formyl-19-nor-androstan-17β-ol.
17. 2-formyl-17α-methyl-19-nor-androstan-17β-ol.
18. 2α-formyl-17α-ethynyl-19-nor-androstan-17β-ol.
19. 2β-formyl-17α-ethynyl-nor-androstan-17β-ol.
20. A process for preparing a compound of the following formula:

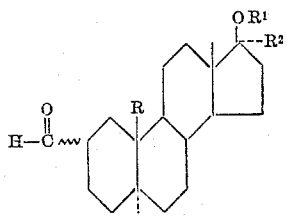

wherein R is selected from the group consisting of hydrogen and methyl; R¹ is selected from the group consisting of hydrogen and a hydrocarbon carboxylic acyl group of less than 12 carbon atoms; and R² is selected from the group consisting of hydrogen, lower alkyl, lower alkenyl and lower alkynyl comprising oxidizing with chromic acid a compound of the following formula:

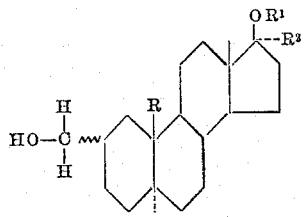

wherein R, R¹ and R² have the same meaning defined above at a low temperature.

21. A process for preparing a compound selected from the group consisting of 2β-formyl-androstan-17β-ol, 2β-formyl-19-nor-androstan-17β-ol, 2β-formyl-17α-lower alkyl-androstan-17β-ol and 2β-formyl-17α-lower alkyl-19-nor-androstan-17β-ol comprising hydrogenating the corresponding 2-formyl-Δ²-androsten-17β-ol compound in the presence of a palladium catalyst until one molar equivalent of hydrogen is absorbed.

22. A process for preparing a compound selected from the group consisting of 2α-formyl-androstan-17β-ol, 2α-formyl-19-nor-androstan-17β-ol, 2α-formyl-17α-lower alkyl-androstan-17β-ol and 2α-formyl-17α-lower alkyl-19-nor-androstan-17β-ol comprising reacting the corresponding 2β-formyl derivative with an alkali metal lower alkoxide.

23. A process for preparing a 2α-formyl-androstan-17β-ol derivative comprising reducing a 2-lower alkoxymethylenedihydroallotestosterone with lithium aluminum hydride and hydrolyzing the thus formed 2-lower alkoxymethylene-androstan-17β-ol with acid for a prolonged period of time.

References Cited in the file of this patent

UNITED STATES PATENTS 2,883,401  Babcock et al. _____ Apr. 21, 1959